United States Patent Office 3,344,671
Patented Oct. 3, 1967

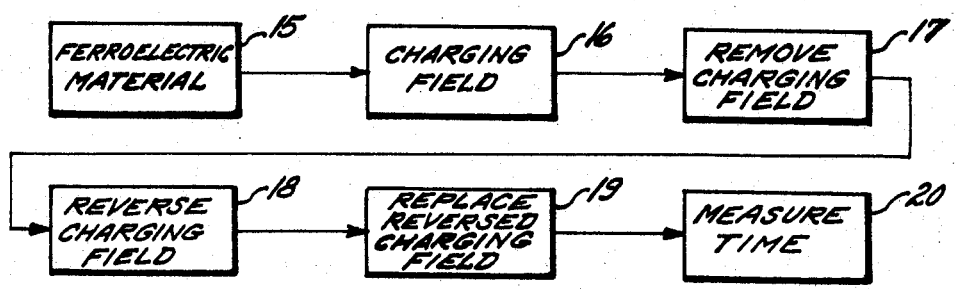
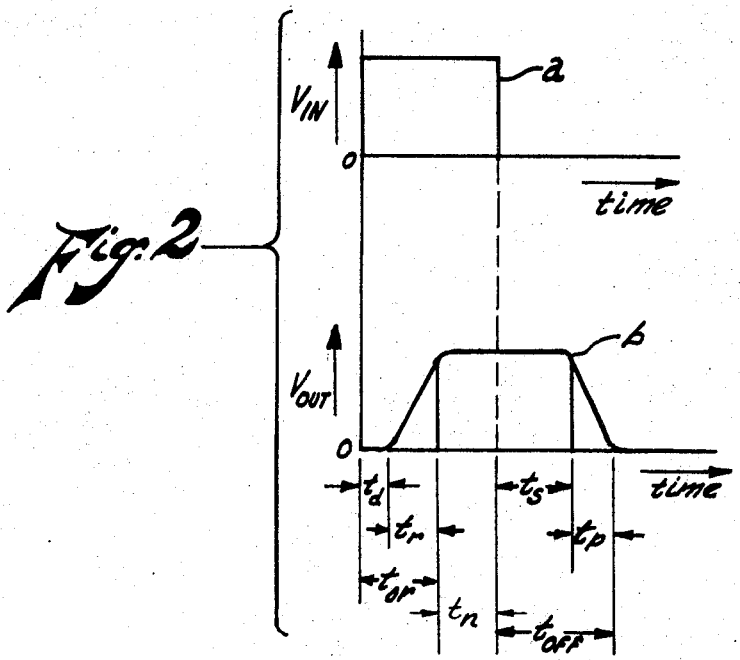

3,344,671
TIME MEASUREMENT AS INDICATION OF TEMPERATURE
Irving Gordy and Henry J. Bush, Rome, N.Y., assignors to the United States of America as represented by the Secretary of the Air Force
Filed Dec. 3, 1964, Ser. No. 415,837
3 Claims. (Cl. 73—362)

ABSTRACT OF THE DISCLOSURE

Method for determining ambient temperature by time measurements including the steps of polarizing a material until it reaches a stable state, repolarizing the material with the opposite polarity and measuring the time required for the return to a stable state. Measurements may also be made of the pulse deformation after passage through semiconducting materials to provide ambient temperature indications.

The invention described herein may be manufactured and used by or for the United States Government for governmental purposes without payment to us of any royalty thereon The present invention relates to temperature measurement and more particularly to the measurement of temperature as a function of time.

Generally most of the parameters involved in a particular research may be measured to any practically desired amount of accuracy, however, when one becomes concerned with temperature as a parameter, it is not uncommon that the measurement is limited to only the nearest fraction of a degree.

To improve present methods of temperature measurement requires an impractical increase in the stability of instrumentation. Such an increase in stability is temperature dependent and is, for practical purposes, impossible. For example, an increase in self-heating of the sensitive resistance element of a known device to increase stability would have a detrimental effect on the reading of the instrument, causing it to be less sensitive.

Since time measurement is independent of the environment of the event, we have found that temperature may be determined by making time measurements of the signal output of various electronic devices. These devices include semiconductors in the form of delay lines, transistors and diodes, and ferroelectric materials such as barium titanate.

The temperature-time relationship in the delay line is an effect of the temperatures dependence of charge carrier mobility, minority carrier lifetime, diffusion and the difference between group velocity of the pulse and phase velocity of the individual carriers. In the case of the transistor the relationship is an effect of base-emitter capacitance. The diode temperature-time relation is substantially the same as in delay lines, the effect being caused by charge carrier mobility and minority carrier lifetime.

Ferroelectric materials obtain a temperature-time relationship as a result of switching characteristics to be described hereinafter.

Accordingly, it is an object of this invention to provide a method of, and apparatus for measuring ambient temperature of an event by measuring the time of occurrence of the event.

Another object of this invention is to provide a method of measuring temperatures to at least one part in $10^{10}$.

Another object of this invention is to provide a method of measuring temperatures which is independent of environmental temperatures.

Another object of this invention is to provide a method of and apparatus for measuring temperature by measuring the deformation of an electronic pulse through a material.

Another object of this invention is to provide a method of, and apparatus for measuring temperature by measuring the travel time of an electronic pulse through a material.

Another object of this invention is to provide a method of, and apparatus for measuring temperature by measuring the switching characteristics of a material.

A further object of this invention is to provide an apparatus for measuring temperature by utilizing semiconducting or ferroelectric materials.

Other objects and advantages of the invention will be apparent from the following description and accompanying drawings.

In the drawings:

FIGURE 1 diagrammatically illustrates in block form the semiconducting temperature measuring system embodying the invention;

FIGURE 2 illustrates the input and output pulse wave forms; and

FIGURE 3 diagrammatically illustrates in block form the ferroelectric temperature measuring method of the invention.

Our invention shows that spreading (change in time) of a pulse may be made temperature dependent. It has likewise been discovered that this spreading is directly proportional to temperature. Similarly, we have found that the length of time a pulse takes to travel from one point to another is directly proportional to temperature.

Considering these effects as pulse response, we now refer to FIGURE 1 where there is shown in block form the semiconducting temperature measuring means embodying the invention. The pulse signal generator 10, of a conventional design, is capable of producing a pulse of known dimensions and is connected to the semiconducting material 12. The semiconducting means may be in the form of a delay line, transistor or diode, and is utilized as the temperature sensor. The pulse measuring device 13, operably associated with the temperature sensor, may likewise be of conventional design such as a cathode ray oscilloscope. The possibility of heating the temperature sensing device is minimized in this concept since low duty cycles are used, requiring a minimum amount of power.

The pulse from the generator 10 may be in the form of a square wave as shown by curve $a$ in FIGURE 2. The wave is deformed as it passes through the temperature sensing means and becomes a pulse of the form shown as curve $b$ in FIGURE 2.

Concerning output wave form $b$ of FIGURE 2, the total measured time is equal to: $t_{on} + t_{off}$, where $$t_{on} = t_d \text{ (delay time)} + t_r \text{ (rise time)}$$
$$t_{off} = t_s \text{ (storage time)} + t_f \text{ (fall time)}$$

The unit of time $t_n$ is the length of time the pulse remains at its maximum before it is cut off. Since this may vary from one unit of time to almost infinity depending on the pulse width of $a$, it will have no bearing on our determination of the temperature by time measurement which is, as hereinbefore stated, a measurement of the rise and fall time of the pulse as well as the delay and storage time.

In practice an oscilloscope could be used for measuring the pulse deformation. Curve $a$ would be placed on the calibrated face of the cathode ray tube, superimposed over curve $a$ would be curve $b$, in this manner it is possible to obtain an instantaneous measurement of the pulse deformation.

The temperature of a body can be easily and accurately measured with this method and apparatus assuming all signal input variables remain essentially constant from measurement.

Concerning FIGURE 3, there is shown a diagrammatic representation of this invention utilizing ferroelectric materials in place of semiconducting materials.

A linear relationship may be found between switching time and temperature of some ferroelectric materials, such as barium titanate, when used as storage devices. Conversely, to the semiconducting materials, the ferroelectric materials produce a desired measurement which is inversely proportional to the temperature.

The theory of the ferroelectric material is substantially that when a ferroelectric material is below its Curie point, the width of the hysteresis loop, which determines the distance between polarized stable states (i.e., positive and negative) is inversely proportional to the temperature. The time of switching results from the hysteresis distance between the oppositely polarized stable states of the ferroelectric.

The method of measuring temperature with ferroelectric materials is as follows: a ferroelectric material 15, such as a capacitor, is placed into the environment whose temperature is desired. The charging field 16 is placed around the material, polarizing it, and then removed, as shown at 17. The ferroelectric is now in one of its stable states. The polarity of the charging field is reversed as illustrated at 18 in the drawing, and again applied to the material at 19. By measuring the time 20 it takes for the ferroelectric to switch to its other stable state, it is possible to determine the temperature of the environment.

The temperature measurement would be made in a manner similar to that used for semiconducting materials herein explained. A cathode ray oscilloscope having a calibrated scale is utilized. In the ferroelectric mode of operation the magnitude of the polarizing field must be kept constant.

While the invention herein described is not direct reading, once a reference temperature is chosen, the temperature corresponding to the measured time may easily be determined by merely referring to the appropriate calibration chart.

Although the invention has been described with reference to a particular embodiment, it will be understood to those skilled in the art that the invention is capable of a variety of alternative ambodiments within the spirit and scope of the appended claims.

We claim:
1. In a method for determining temperature the steps of, placing a material in the environment whose temperature is desired, polarizing said material until it reaches a stable state, repolarizing said material with the opposite polarity, measuring the time required for the said material to return to a stable state and determining the temperature corresponding to the time.

2. A method for measuring temperature including the steps of, charging a material in the environment to be measured, stabilizing the charge, reversing the polarity of the charge, restabilizing the charge, measuring the time required for said material to change from one stable state to the other, correlating the time to the temperature.

3. In a method for measuring temperature the steps of, charging a ferroelectric material in the environment whose temperature is desired, removing the charging field and permitting the material to stabilize, reversing the polarization and applying said field to the material, measuring the time required for the material to switch to a second stable state and correlating the time to temperature.

References Cited

UNITED STATES PATENTS

| 3,054,044 | 9/1962 | Shevel | 73—362 X |
| 3,137,169 | 6/1964 | Clement et al. | 73—339 |
| 3,211,002 | 10/1965 | Franklin | 73—362 |

FOREIGN PATENTS

| 727,891 | 4/1955 | Great Britain. |
| 147,815 | | U.S.S.R. |

LOUIS R. PRINCE, *Primary Examiner.*

F. SHOON, *Assistant Examiner.*